United States Patent [19]

Kiyohara et al.

[11] 3,879,118

[45] Apr. 22, 1975

[54] EXPOSURE CONTROL APPARATUS

[75] Inventors: Takehiko Kiyohara, Zama; Tokuichi Tsunekawa, Yokohama; Yoshiyuki Takishima; Soichi Nakamoto, both of Tokyo; Tetsuya Taguchi, Kawasaki; Yukio Mashimo, Tokyo, all of Japan

[73] Assignee: Canon Kabushiki Kaisha, Tokyo, Japan

[22] Filed: Jan. 23, 1974

[21] Appl. No.: 435,832

[30] Foreign Application Priority Data

Feb. 1, 1973 Japan .................. 48-13430

[52] U.S. Cl. .................. 354/24; 354/50; 354/51; 354/60 L

[51] Int. Cl. .................. G03b 7/08; G03b 17/18

[58] Field of Search .................. 95/10 CT; 354/50, 51, 24, 354/60 R, 60 EI, 60 L

[56] References Cited

UNITED STATES PATENTS

| | | | |
|---|---|---|---|
| 3,742,826 | 7/1973 | Kohtani | 95/10 CT |
| 3,748,979 | 7/1973 | Wada | 95/10 CT |

FOREIGN PATENTS OR APPLICATIONS

| | | | |
|---|---|---|---|
| 45-4903 | 2/1970 | Japan | 95/10 CT |

*Primary Examiner*—Samuel S. Matthews
*Assistant Examiner*—R. E. Adams
*Attorney, Agent, or Firm*—Toren, McGeady and Stanger

[57] ABSTRACT

A photographic exposure control apparatus for a single lens reflex camera having an electrically timed shutter. The apparatus is characterized in the use of a variable frequency pulse-forming circuit in combination with a pulse frequency control circuit and a pulse frequency modulating circuit for providing shutter interval control signals. Responsive to the level of luminance of a subject being photographed just before film exposure is initiated, the pulse frequency control circuit controls the frequency of the pulse-forming circuit so as to sufficiently reduce the time necessary for storing a group of pulses of which the number depends upon the level of subject luminance. The pulse frequency modulating circuit simultaneously modulates the frequency of pulses supplied thereto from the pulse-forming circuit in such a way that when the number of pulses modulated reaches the number of pulses stored, an exposure interval is established.

15 Claims, 5 Drawing Figures

FIG. 5

| SHUTTER TIME | ACTUAL TIME INDICATION SYSTEM (s, ms) | TWO-FIGURE INDICATION SYSTEM (ms, s) | T OF OSC AT MEMORY | T OF OSC AT TIME CONTROL | COMPRESSION RATE OF CONDENSER C |
|---|---|---|---|---|---|
| 1/2000 | 50 | .50 ms | 1 μs | 1 μs | 1 |
| 1/1000 | 10 | 1.0 ms | 10 μs | 10 μs | 1 |
| 1/500 | 20 | 2.0 ms | " | " | |
| 1/250 | 40 | 4.0 ms | " | " | |
| 1/125 | 80 | 8.0 ms | " | " | |
| 1/60 | 16 | 16 ms | 100 μs | 100 μs | 1 |
| 1/30 | 32 | 32 ms | " | " | |
| 1/15 | 64 | 64 ms | " | " | |
| 1/8 | 13 | .13 S | 1 μs | 1 ms | $\frac{1}{1000}$ |
| 1/4 | 25 | .25 S | " | " | |
| 1/2 | 50 | .50 S | " | " | |
| 1 | 10 | 1.0 S | 10 μs | 10 ms | $\frac{1}{1000}$ |
| 2 | 20 | 2.0 S | " | " | |
| 4 | 40 | 4.0 S | " | " | |
| 8 | 80 | 8.0 S | " | " | |
| 15 | 16 | 16 S | 100 μs | 100 ms | $\frac{1}{1000}$ |
| 30 | 32 | 32 S | " | " | |
| 60 | 64 | 64 S | " | " | |

EXPOSURE CONTROL APPARATUS

This invention relates to an exposure control apparatus, and more particularly it relates to an exposure control apparatus adapted for use in a single lens reflex camera having an electrically timed shutter.

In the use of electrically controlled shutter for single reflex cameras, it is impossible to automatically regulate the exposure interval in accordance with the level of subject luminance as sensed photoelectrically during film exposure, because the photographic objective of the single lens reflex camera of TTL type serves to constitute a part of the optical finder system of which the light path is blocked during the duration of exposure interval.

In order to overcome such a drawback, various solutions have been proposed for an electrical exposure control apparatus. According to one proposal disclosed in British Pat. No. 1,148,059, an information representative of the level of subject luminance is stored in a condenser in the form of a voltage, and this voltage is used to establish exposure interval. According to another proposal disclosed in U.S. Pat. No. 3,442,190, the automatic exposure control system is provided with a photoconductive element as the light-receiving element to utilize the inertia of the photoconductive element. As has been already proposed by the present applicant in U.S. Pat. No. 3,742,826, the information representative of the level of subject luminance is stored in a register circuit in the form of grouped digital pulses, and, upon completion of the shutter release, the counting of the stored digital pulses is started in synchronism with reference pulses to establish shutter interval.

In normal photography application without using artificial illumination such as flash light, the luminance of a subject which may be usually encountered is in a range from EV-3 to EV-18. In other words, the ratio of the minimum subject luminance to the maximum is 1 : $2^{21}$ which may be considered to consist of 21 stages. On the other hand, it is almost common in general purpose cameras that the dynamic range of shutter speed control in the exposure control system thereof extends from 1/2000 second to 60 seconds, the ratio being 1 : $2^{17}$ or 17 stages. Also the dynamic range of the diaphragm aperture control in the same exposure control system extends from $f$ 1 : 1.4 to $f$ 1 : 22, the ratio being 1 : $2^{8}$ or 8 stages. Since the combinations of shutter speed control and diaphragm aperture control permits exposure values to be derived in a range of 17 stages plus 8 stages, or 25 stages, it is possible to make the exposure control apparatus sufficiently responsive to the intensity of subject illumination extending over 21 stages.

However, the previously proposed exposure control apparatus of the present applicant in U.S. Pat. No. 3,742,826 has a disadvantage of increasing the number of pulses to be stored in proportion to the level of subject luminance as the resultant shutter interval increases. For example, in case the interval between the successive reference pulses is 100$\mu$ seconds, five pulses are necessary to establish a shutter interval of 1/2000 second, and $6 \times 10^5$ pulses for 60 seconds. The period of time necessary for storing 5 or $6 \times 10^5$ pulses in 500$\mu$ seconds or 60 seconds respectively, the difference being too large to be employed in practice. A further disadvantage is that the accuracy weight assigned to each pulse is different with different shutter intervals, being 20 percent with 1/2000 second and $1.7 \times 10^{-4}$% with 60 seconds. Furthermore, in order to display the shutter interval countered in millisecond scale, at least seven readout devices along with the same number of counters are required, thus the complexity of the exposure control apparatus is increased more than necessarily.

The present invention is adapted to overcome the aforesaid drawbacks and disadvantages, and accordingly it is an object of the present invention to provide an exposure control apparatus of the above type in which information representing the level of luminance of a subject being photographed is stored in the form of a number of pulses, characterized in the use of a variable frequency pulse forming circuit in combination with a pulse frequency control circuit and a pulse frequency modulating circuit for providing shutter interval control signals. The pulse frequency control circuit controls the frequency of the variable frequency pulse-forming circuit in accordance with the level of subject luminance as photoelectrically sensed just before film exposure is started so as to sufficiently reduce the time necessary for storing a group of pulses, the number of pulses in the group depending upon the level of subject luminance. The pulse frequency modulating circuit simultaneously modulates the frequency of pulses supplied thereto from the pulse-forming circuit in such a way that when the number of pulses modulated reaches the number of pulses stored, an exposure interval with high accuracy is established.

Other objects, features and advantages of the invention will be best understood upon perusal of the following detailed description of certain specific embodiments with reference to the accompanying drawings in which:

FIG. 5 illustrates a series of shutter speeds and their respective indicia which can be displayed by either of seven or two figures in digit readout devices adapted for use with the circuit of FIG. 3 in connection with the corresponding combinations of frequencies of oscillation for memory and reference along with the compression ratios of a condenser C.

Figure 1:
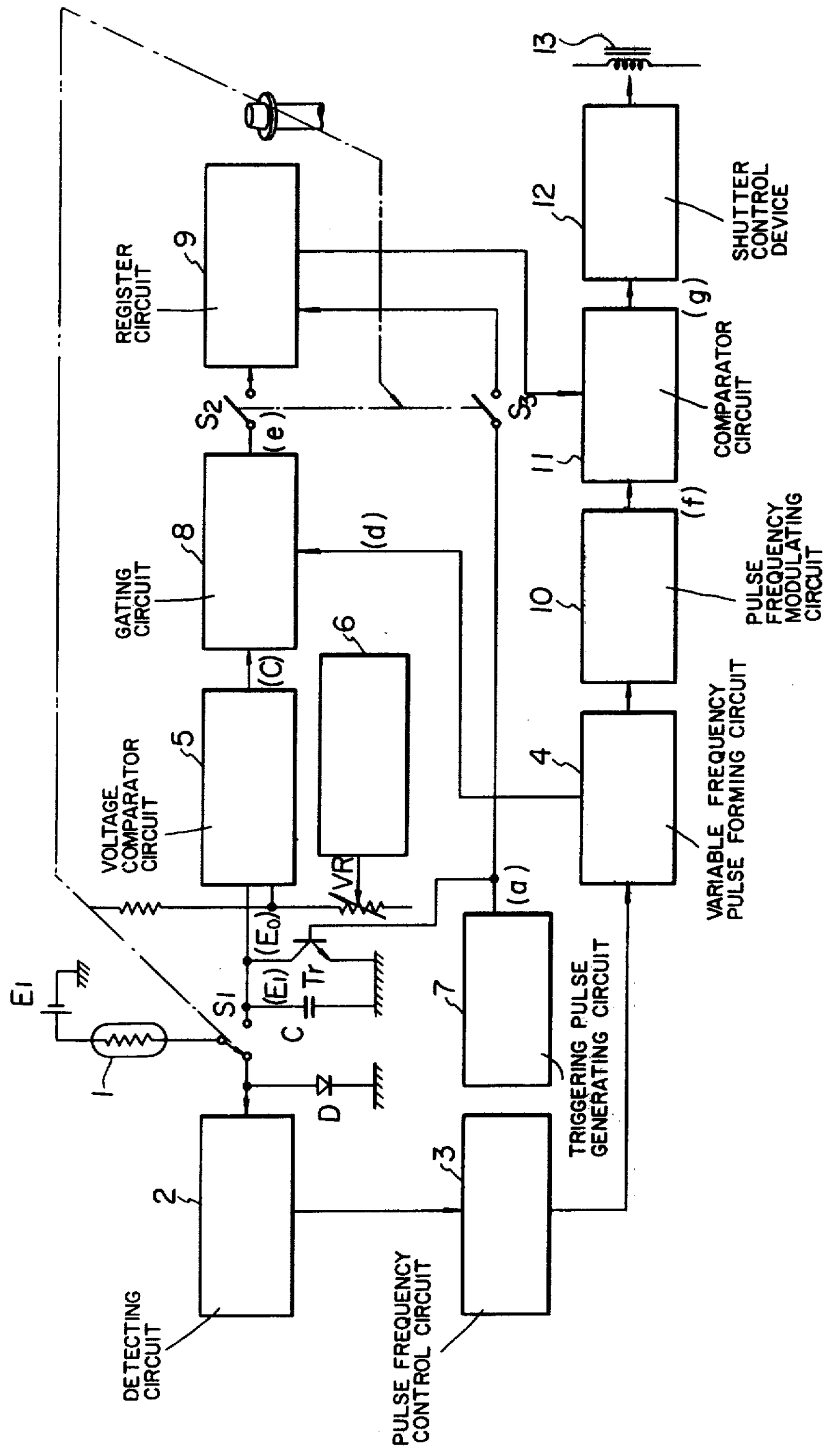
FIG. 1 is a fragmentary partly diagrammatic and partly perspective view of an embodiment of the electrical circuit of an exposure control apparatus of the present invention.
Figure 2:
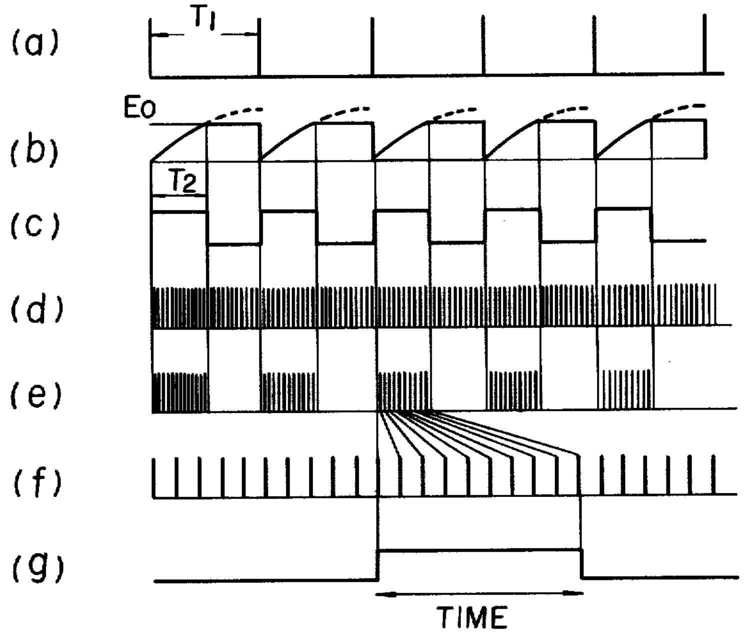
FIG. 2 is a diagram of typical pulse waveshapes occurring at various points in the circuit of FIG. 1.

Referring now to FIG. 1, one embodiment of the circuit of an exposure control apparatus of the invention is illustrated as comprising a light-receiving element such as a photoconductive cell arranged in a finer optical system of a general purpose single lens reflex camera of TTL type to receive the light from a subject through the photographing lens so that the resistance of element 1 is varied in accordance with the intensity of the light. When the shutter release button is pushed down to the first stage, the element 1 is connected to a diode D through a transfer switch $S_1$ as illustrated in FIG. 1. The diode D is selected to have a linear logarithmic response range with respect of a current input and a voltage output proportional to the logarithm of the input. The voltage output representing the level of subject luminance is detected by the detecting circuit 2 and is then stored in a condenser incorporated in a pulse frequency control circuit 3. Connected to the circuit 3 is a variable frequency pulse-forming circuit 4 so that the interval between the successive pulses generated by the pulse-forming circuit 4 is directly proportional to the detected voltage. The sequence of pulses is shown in FIG. 2*d*. The frequency of the pulse-forming circuit, therefore, depends upon the level of subject luminance. As the subject luminance increases, the frequency decreases in proportion to the logarithm of the subject luminance. When the shutter release button is further pushed down from the first stage to the second stage, the transfer switch $S_1$ is operated from the position illustrated in FIG. 1 to the other position, so that the light-receiving element is connected to a condenser C, a transistor Tr and a voltage comparator circuit 5, while the level of subject luminance as sensed just before the further depression of the shutter release button is memorised in the pulse frequency control circuit 3. The current output of the element 1 charges the condenser to a voltage $E_1$. The charging process is illustrated in FIG. 2*b*. The condenser is selected to have such a capacity that the voltage $E_1$ reaches a voltage level $E_o$ dependent upon the diaphragm aperture size and film sensitivity in a period of time $T_2$ that is shorter than the resultant exposure interval. In the embodiment of FIG. 1, the period of time $T_2$ is 1/1000 times the resultant exposure interval. The voltage level $E_o$ is set by varying the resistance of a variable resistor VR in accordance with the present diaphragm value and the sensitivity of the associated photographic film. Connected to the base of the transistor Tr is a triggering pulse generating circuit 7 which may include as a source of oscillation an astable multivibrator which is operated at a fixed frequency, so that upon advent of triggering pulses in the proper time sequence as illustrated in FIG. 2a, the transistor Tr is rendered conductive to short-circuit the condenser. The period $T_1$ of the triggering pulses $T_1$ should be such that any of the digital informations derived from the electric quantity of magnitude proportional to the level of subject liminance through the detector circuit 2, pulse frequency control circuit 3 and pulse-forming circuit 4 can be stored in a register circuit 9 to be described later in a period shorter than the period $T_1$. Connected between the pulse-forming circuit 4 and register circuit 9 is a gating circuit 8 which is switched conductive by the voltage comparator circuit as long as the voltage $E_1$ is lower than the reference voltage level $E_0$, so that pulses generated by the pulse-forming circuit 4 are allowed to pass through the gating circuit during the period $T_2$ to the register circuit 9 in which a group of pulses as illustrated in FIG. 2*e* are stored. The register circuit 9 may include a flip-flop circuit which is reset at every triggering pulse by the conduction of the transistor Tr of which the corrector and emitter electrodes are connected with the terminals of the condenser respectively. The voltage comparator circuit 5 produces a higher voltage output so long as voltage $E_1$ is lower than the reference voltage $E_o$, and a lower voltage output when the voltage $E_1$ reaches the reference voltage $E_o$. The situation is as illustrated in FIG. 2c. Switches $S_2$ and $S_3$ are arranged between the gating circuit 8 and the register circuit 9, and between the triggering pulse generating circuit 7 and the register 9 respectively to perform gating actions, and are simultaneously opened in synchronism with the triggering pulse when the front screen of focal plane shutter is released from the closed position, or when the pivoting movement of the reflecting mirror in the single lens reflex camera is started, or when the automatic aperture regulating mechanism is actuated. When the switches $S_2$ and $S_3$ are open, no group of pulses (FIG. 2*e*) is supplied to the register circuit so that the group of pulses supplied just before the switches $S_2$ and $S_3$ are opened are not renewed by the next group of pulses, thus being stored in the resister circuit 9. Responsive to the pulses from the pulse-forming circuit 4, the pulse frequency modulating circuit 10 generates pulses with a period which is 1000 times the period of the pulse-forming circuit 4, because the compression ratio of the condenser is 1000 : 1. The sequence of pulses of the modulated frequency is as illustrated in FIG. 2F. When the number of pulses of the modulated frequency that appears in a comparator circuit 11 reaches the number of pulses stored in the register circuit 9, the comparator circuit provides a comparison-finish signal (FIG. 2*g*) which is applied to the shutter control device 12 to terminate the duration of exposure interval, through the shutter driving device 13.

The operation is as follows. When the light rays from a subject being photographed strikkes the light-receiving element 1, the resistance R of the element 1 is varied in accordance as a function of $R = KI^{-1}$. Therefore, the current I flowing through the diode is varied as a function of the resistance R. The voltage across the diode is proportional to the logarithm of the current, so that the logarithm of the level of subject luminance is detected by the detector circuit 2. The detected voltage is then applied to the pulse frequency control circuit 3 to control the frequency of pulses which are generated by the pulse-forming circuit 4. On the other hand, the variable resistor VR is set at a reference voltage $E_o$ dependent upon the sensitivity of the associated film and the preselected diaphragm aperture value. When the shutter release button is pushed down to the second stage, the switch $S_1$ is set from the position illustrated in FIG. 1 to the other position, thereupon the element 1 is connected to the condenser C, and at the same time the switches $S_2$ and $S_3$ are closed, so that the condenser is charged from the element 1. The voltage $E_1$ of the condenser increases as the length of time increases as shown in FIG. 2*b*. So long as the voltage $E_1$ is lower than the reference voltage $E_o$, the voltage output of the voltage comparator circuit renders the gating circuit 8 conductive, so that the pulses generated by the pulse-forming circuit 4 are supplied to the register circuit 9 through the switch $S_2$. When the voltage $E_1$ reaches the reference voltage $E_o$, the gating circuit is switched non-conductive, thereupon the sequence of pulses is terminated. However, the transistor connected to the condenser is made conductive by triggering pulses of period $T_1$ to short-circuit the condenser, so that sequential groups of pulses are applied to the register circuit 9 as shown in FIG. 2*c*. It is to be noted that while the frequency of pulses from the circuit 4 is a linear function of the logarithm of subject luminance, the number of pulses stored in the register circuit is a function of subject luminance, diaphragm value and film sensitivity. When the shutter release button is further pushed down from the first stage to the second stage, the switches $S_2$ and $S_3$ are turned off simultaneously so that the connection between the gating circuit 8 and the register circuit 9 is cut off, and at the same time the film exposure is initiated. On the other hand, responsive to pulses generated by the pulse-forming circuit 4, the pulse frequency modulating circuit 10 generates pulses of modulated frequency as shown in FIG. 2f. While the number of pulses of the modulated frequency from the circuit 10 is compared with the number of pulses stored in tne register circuit 9 by the comparator circuit 11, the shutter control circuit energizes the electro-magnet 13 to hold the rear screen of the focal plane shutter in the opened position. At the instant when the number of pulses from the circuit reaches the number of pulses stored in the register circuit 9, the shutter control circuit 12 deenergizes the electro-magnet 13, so that the rear screens of the focal plane shutter is released to terminate the duration of exposure interval.

From the foregoing description, it will be appreciated that as the subject luminance decreases, the frequency of pulses increases in proportion to the logarithm of the subject luminance, but the time required for a group of pulses to be stored can be decreased to a desired predetermined value by increasing the compression ratio of the condenser to the corresponding value. In controlling the duration of exposure interval, the number of pulses from the circuit 10 is compared with the number of stored pulses so that the exposure interval is controlled with high accuracy in accordance with the level of subject luminance as photoelectrically sensed.

In another embodiment shown in FIG. 3, the exposure control apparatus shown in FIG. 1 is modified in the following two points. Instead of the variable resistor VR, there are provided a diaphragm means 32.and a ND filter arranged in front of a high response photodiode 31 used as the light-receiving element 1 to control the energy of light impinging upon the element 1 in accordance with the sensitivity of the associated film and the preselected camera diaphragm value. Instead of the pulse-forming circuit 4, and the pulse frequency modulating circuit 10, there are provided a crystal oscillator 39 having a plurality of output terminals with different periods of oscillation, and switching circuits 37 and 38 which are operated by a memory pulse frequency-selector circuit 35.

Figure 3:
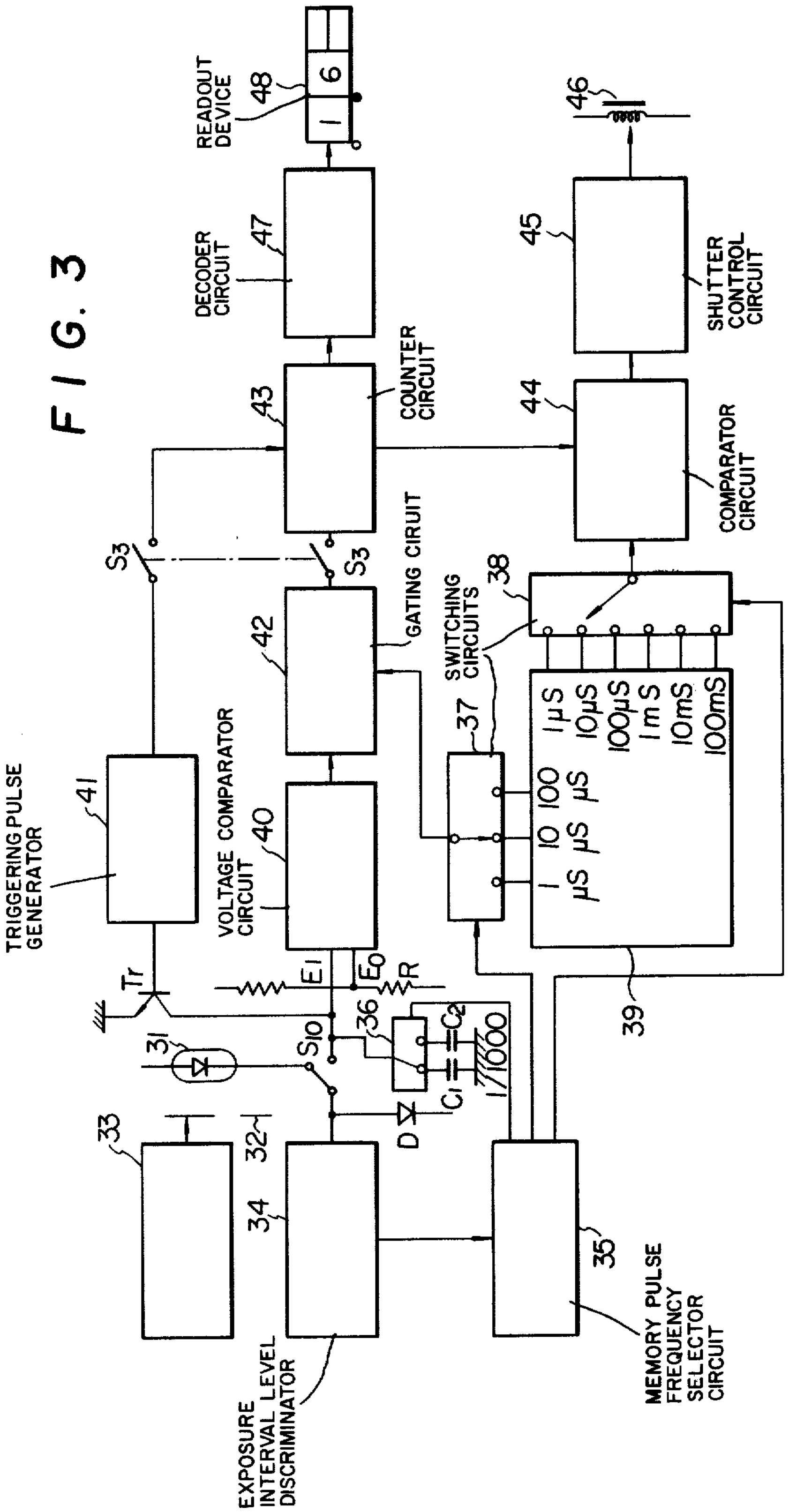
FIG. 3 is a diagrammatic view of another embodiment of the circuit of an exposure control apparatus of the present invention.

The operation of the exposure control system illustrated in FIG. 3 is as follows. When the shutter release button is pushed down to the first stage, the light-receiving element 31 is connected to exposure interval level discriminator circuit 34 through a transfer switch $S_{10}$. Responsive to the exposure time level discrminated by the discriminator circuit 34, the circuit 35 produces switch-selection signals which are to be sent to the respective switching circuits 35, 37 and 38, thereupon the crystal oscillator is set at two frequencies of oscillation, one of which is adapted for memory of pulses of a period selected from a series of predetermined periods, namely 1$\mu$ sec., 10$\mu$ sec. and 100$\mu$ sec. and which is applied to the gating circuit 42, and the other is clock pulses of a period selected from a series of predetermined periods, namely, 1$\mu$ sec., 10$\mu$ sec., 100$\mu$ sec., 1 m sec., 10 m sec. and 100 m sec. When the shutter release button is further pushed down from the first stage to the second stage, the transfer switch $S_{10}$ is set from the position illustrated in FIG. 3 to the other position, thereupon the element 31 is connected to the voltage comparator circuit 40 and at the same time, the discrimated exposure time level is memorized in the selector circuit 35. Also the element 31 is connected to either of two condensers of different capacitance, namely condenser $C_1$ of a compression ratio of 1 : 1 and condenser $C_2$ of a compression ratio of 1000 : 1. The charge stored on the condenser $C_1$ or $C_2$ is allowed to leak away through the transistor Tr which is rendered conductive at the end of the period $T_1$. The counter circuit 43 also is reset by triggering pulses from a triggering pulse generating circuit 41. The voltage comparator circuit produces a coincidence signal when the voltage $E_1$ has reached the reference voltage $E_0$. Upon advent of the coincidence signal, the gating circuit 42 is switched non-conductive, so that a group of memory pulses illustrated in FIG. 2d is supplied in a period of time $T_2$ from the crystal oscillator 39 to the counter circuit 43 through the switching circuit 37 and the gating circuit 42. Switches $S_2$ and $S_3$ are arranged between the gating circuit 42 and the counter circuit 43, and between the triggering pulse generating circuit 41 and the counter circuit 43 respectively to perform gating actions, and are simultaneously opened in synchronism with the triggering pulses when the front screen of focal plane shutter is released from the colsed position, or when the pivoting movement of the reflecting mirror in the single lens reflex camera is started, or when the automatic aperture regulating mechanism is actuated. When the switches $S_2$ and $S_3$ are opened, no group of pulses (FIG. 2*e*) is supplied to the counter circuit 43 so that the group of pulses supplied just before the switches $S_2$ and $S_3$ are opened, are not renewed by the next group of pulses, thus being stored in the counter circuit 43. The transfer switch 38 shifts the cnnection between the crystal oscillator circuit 39 and the comparator circuit 44 such that the crystal oscillator circuit generates clock pulses of a period as shown in FIG. 2*f*. The sequence of clock pulses that appear in the comparator circuit 44 read out the shutter interval control information from the counter circuit 43 storing $n_1$ pulses. When the number of clock pulses has reached $n_1$, the comparator circuit generates a comparison-finish signal which is applied to the shutter control circuit 45 which drives the shutter driving device 46 to terminate the duration of exposure interval.

On the other hand, $n_1$ pulses stored in the counter circuit 43 are counted in a decade scaler system associated with the decoder circuit 47, and are displayed in a readout device 48 using fluorescent material or liquid crystal. FIG. 5 is a table showing two display systems applicable to the invention. In the embodiment of FIG. 1, a seven-figure readout device is required for any of the available shutter intervals to be displayed in one scale. However, in the embodiment shown in FIG. 3, it is possible to employ a two-figure readout device. In this case, provision must be made for two scales, namely ms (millisecond) and s (second). The selection of either of the scale marks may be made by using switch 36. In order to shift the decimal point, the display system may be connected to the switch 37. By using a two-figure readout device, two decimal point-indicating means and two scale mark-indicating means, it is possible to indicate the derived shutter interval in scale-of-10 system.

Figure 4:
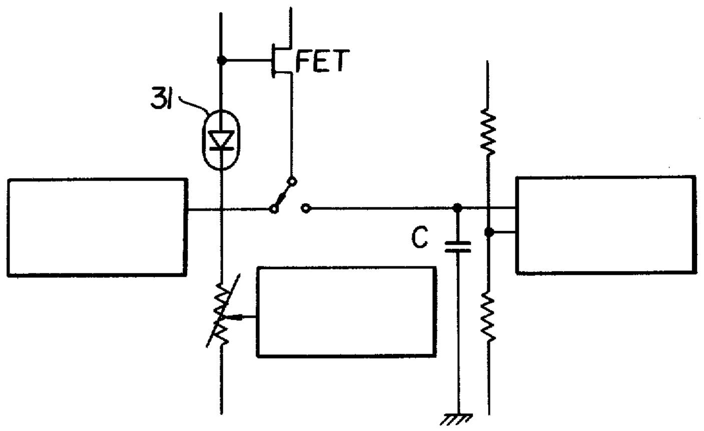
FIG. 4 is a fragmentary diagrammatic view of the circuit of FIG. 3 with a modification.

The invention has been described above in connection with two specific embodiments which can be changed and modified in many ways. For example, instead of the arrangement of the diode and the circuit 33 which is set according to the exposure control parameters such as the ASA sensitivity and diaphragm value, it is possible to use a FET transistor and a variable resistor arranged as shown in FIG. 4. In this modified arrangement, the output of the photodiode can be used as shutter interval control signals. In the embodiment with a modification, the level of subject luminance as photoelectrically sensed is compressed by the use of a diode having logarithmic characteristics or a FET transistor in order to form a signal capable of varying the frequency of pulses to be stored. But such a construction is not always necessary. For example, without using any diode or FET transistor, the output of the light-receiving element is directly used to vary the frequency of pulses to be memorized as well as the frequency of clock pulses. In this case, in order to generate clock pulses of which the frequency is far smaller than the frequency of memory pulses, a pulse-forming circuit is selected to have such a performance that the interval between the successive memory pulses can be controlled in accordance with the level of output of the light-receiving element, or a pulse-forming circuit and a pulse interval multiplier circuit have to be employed in combination. In the latter connection, the pulse frequency modulating circuit shown in FIG. 1 may be omitted in some cases.

As will be seen from the foregoing description, the present invention provides a very excellent camera system by the use of a variable frequency pulse-forming circuit in combination with a pulse frequency control circuit and a pulse frequency modulating circuit for the purpose of controlling exposure interval in accordance with the level of luminance of a subject being photographed so as remarkably reduce the time required for a group of pulses to be memorised in a memory circuit such as a register circuit as well as for the purpose of permitting the exposure control apparatus to perform the shutter timing operation with improved accuracy independent of different magnitudes of exposure interval by comparing the number of pulses stored with the number of reference pulses.

What is claimed is:

1. An exposure control apparatus comprising;

photoelectric means for converting an amount of light to an electric quantity, memory means, pulse entry means connected with said memory means, shutter control means for producing shutter operating signal, comparing means responsive to a signal from said control means and coupled to the memory means for reading out the contents of it and controlling said control means for a time period dependent upon the content of the memory means, pulse producing means for producing a sequence of sets of equally spaced pulses each sets corresponding in number to the electrical quantity, the frequency of which is in inverse-relation with the electrical quantity, said memory means being connected to said pulse producing means through said entry means for storing a count equal to the pulse entered, said entry means having a gate means for applying said pulse to said memory means in response to a shutter operating signal from said control means, and a time-forming circuit means selectively connected to said photoelectric means for producing a gate pulse signal for said gate means, the pulse width of which is in relation with the electrical quantity, and detecting means coupled to said memory means for producing a shutter closing signal when the pulse have read the full count by said comparing means.

2. An apparatus according to claim 1, wherein said pulse producing means have logarithmic compression means connected to the photoelectric means, pulse generating means responsive to a signal from the compression means for producing a sequential pulse train, the frequency of which is substantially inverse relation with the signal, and frequency divisor connected between said generator means and said comparing means for expanding the frequency by the compressed rate of the pulse from said pulse generating means.

3. An apparatus according to claim 1, wherein said memory means comprises an indicating means for indicating visually the contents of the memory means.

4. An apparatus according to claim 1, wherein said pulse producing means have a compression means connected to the photoelectric means, pulse generator having a plurality of output from which different frequency-pulses are produced, change-over means changed-over responsive to the output signal from said compression means, the means being connected between the outputs of said pulse generator and said gate means for applying the pulse from one of said outputs of said generator to the gate means.

5. An apparatus according to claim 1, wherein said time-forming circuit produces a timing signal the duration of which is shorter than a shutter opening and closing duration by the compression rate of the pulse from said pulse producing means.

6. An apparatus according to claim 5, wherein said time-forming circuit have a plurality of condenser each having a different capacitance from that of others and change-over means for selecting one of the condenser in response to the signal from said compression means.

7. An exposure control apparatus for cameras, comprising:

photoelectric means for converting an amount of light to an electric quantity, pulse generating means connected to said photoelectric means for producing a sequence of sets of equally spaced pulses, the frequency of which is in inverse-relation with said electric quantity, time-forming circuit means selectively connected to said photoelectric means for producing a gate control signal having a pulse width responsive to said electric quantity gate means having a first input connected to said circuit means and a second input connected to said pulse generating means, shutter control means for producing a shutter operating signal, memory means connected to said gate means, and timing means responsive to a signal from said control means and connected to said memory means for reading out the value in said memory means and controlling said control means for a time period dependent upon the content of said memory means.

8. An apparatus according to claim 7, wherein said time-forming circuit means comprises at least on capacitor selectively connected to said photoelectric means, change-over means connected to said photoelectric means and said capacitor, information signal producing means for inserting photographing information, and a comparing circuit having two inputs, one of which is connected to said capacitor and the other of which is connected to said information signal producing means.

9. An apparatus according to claim 7, wherein said time-forming circuit means comprises at least two capacitors with different capacitances selectively connected to said photoelectric means, change-over means connected between said photoelectric means and said capacitors, information signal producing means for inserting photographing information, and a comparing circuit having two inputs, one of which is connected to one of said capacitors and the other of which is connected to said information signal producing means.

10. An apparatus according to claim 7, wherein said pulse generating means has logarithmic compression means connected to the photoelectric means, pulse generating means responsive to a signal from the compression means for producing a sequential pulse train the frequency of which is substantially in inverse-relation with the signal.

11. An apparatus according to claim 7, further comprising two-digit indicating means for indicating visually the contents of the memory means, shifting means for shifting the decimal points of said indicating means responsive to the electric quantity produced by said photoelectric means.

12. An exposure control apparatus for camera comprising, light sensitive means for converting an amount of light to an electric quantity, holding means for holding said electric quantity produced by said light sensitive means, time-forming circuit means for producing a gate control signal having a pulse width responsive to said electric quantity, change-over means for selectively connecting the output of said light sensitive means with the input of said holding means and the input of said time-forming means, pulse generating means connected to said holding means for producing a sequence of sets of equally spaced pulses, the frequency of which is in inverse-relation with the output signal from said holding means, gate means having a first input connected to said circuit means and a second input connected to said pulse generating means, memory means connected to said gate means, shutter control means for producing a shutter control signal, comparing means having a first input connected to said memory means for reading out the value in said memory means and a second input connected to said pulse generating means for receiving read out timing signals, said comparing means being adapted to start reading out the value memorized in said memory means by virtue of a shutter control signal so as to produce a shutter closing signal upon the completion of reading out the pulse memorized in said memory means.

13. An apparatus according to claim 12, wherein said holding means has a logarithmic compression means for compressing the electric quantity derived from said light sensitive means.

14. An apparatus according to claim 12, wherein said pulse generating means has a plurality of outputs from which different frequency pulses are produced, change-over means changed-over responsive to the output signal from said holding means, the means being connected between the outputs of said pulse generating means and said gate means.

15. An apparatus according to claim 13, wherein said pulse generating means has an expanding means, the means being connected to the input of said comparing means.

* * * * *